US011115275B2

(12) United States Patent
Tanna et al.

(10) Patent No.: US 11,115,275 B2
(45) Date of Patent: Sep. 7, 2021

(54) SYSTEMS AND METHODS FOR AUTOMATED TECHNOLOGY RESOURCE DECOMMISSIONING

(71) Applicant: JPMorgan Chase Bank, N.A., New York, NY (US)

(72) Inventors: Neil Tanna, Kings Langley (GB); Miguel Pascual, Jr., Garnet Valley, PA (US); Hardev Paul, Bedford (GB); Gerald Hugh Dunn, Farnborough (GB); Vinayak Reddy Chintapally, Hyderabad (IN); Phani Indukuri, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/360,160

(22) Filed: Mar. 21, 2019

(65) Prior Publication Data
US 2020/0252282 A1 Aug. 6, 2020

(30) Foreign Application Priority Data
Feb. 6, 2019 (IN) .............................. 201911004697

(51) Int. Cl.
*H04L 12/24* (2006.01)
(52) U.S. Cl.
CPC ........ *H04L 41/0823* (2013.01); *H04L 41/046* (2013.01); *H04L 41/0853* (2013.01);
(Continued)

(58) Field of Classification Search
CPC ............... H04L 41/0823; H04L 41/046; H04L 41/0853; H04L 41/0856; H04L 41/0866; H04L 41/0886; H04L 41/14
See application file for complete search history.

(56) References Cited

U.S. PATENT DOCUMENTS 10,120,714 B1 * 11/2018 Cabrera .................. G06F 9/505
10,637,762 B1 * 4/2020 Traylor ............... H04L 41/0806
(Continued)

FOREIGN PATENT DOCUMENTS

WO 2008086373 7/2008

OTHER PUBLICATIONS

International Search Report, dated Mar. 27, 2020, from corresponding International Application No. PCT/US2020/016482.
(Continued)

*Primary Examiner* — Mohamed A. Wasel
(74) *Attorney, Agent, or Firm* — Greenberg Traurig LLP

(57) ABSTRACT

Systems and methods for automated technology resource decommissioning are disclosed. A method for automated technology resource decommissioning may include the steps of: (1) retrieving information relating to a status of a plurality of technology resources; (2) identifying one of the plurality of technology resources for decommissioning based on the information; (3) creating a decommissioning record for the identified technology resource, the decommissioning record identifying a plurality of micro services for executing a decommissioning plan; (4) executing the decommissioning plan to decommission the identified technology resource; and (5) removing or reusing the decommissioned identified technology resource.

18 Claims, 2 Drawing Sheets

(52) U.S. Cl.
CPC ...... *H04L 41/0856* (2013.01); *H04L 41/0866* (2013.01); *H04L 41/0886* (2013.01); *H04L 41/0893* (2013.01); *H04L 41/14* (2013.01); *H04L 41/50* (2013.01)

(56) References Cited

U.S. PATENT DOCUMENTS

| | | | |
|---|---|---|---|
| 2010/0319060 A1* | 12/2010 | Aiken | G06F 9/50 726/7 |
| 2013/0091257 A1 | 4/2013 | Venugopal et al. | |
| 2016/0330132 A1* | 11/2016 | Rickey | G06F 8/60 |
| 2018/0083887 A1* | 3/2018 | Monda | H04L 47/829 |
| 2018/0176291 A1* | 6/2018 | Kedia | H04L 67/1002 |
| 2018/0260754 A1* | 9/2018 | Marvin | G06N 5/02 |
| 2020/0250595 A1* | 8/2020 | Palani | G06Q 10/0631 |

OTHER PUBLICATIONS

Written Opinion of the International Searching Authority, dated Mar. 27, 2020, from corresponding International Application No. PCT/US2020/016482.

* cited by examiner

SYSTEMS AND METHODS FOR AUTOMATED TECHNOLOGY RESOURCE DECOMMISSIONING

RELATED APPLICATIONS

This application claims priority to Indian Patent Application No. 201911004697, filed Feb. 6, 2019, the disclosure of which is hereby incorporated, by reference, in its entirety.

BACKGROUND OF THE INVENTION

1. Field of the Invention

The present disclosure generally relates to systems and methods for automated technology decommissioning.

2. Description of the Related Art

Organizations often have an inconsistent approach to decommissioning technology, and most decommission processes are manual, inefficient and labor intensive. A lack of consistent information regarding application and infrastructure dependencies may lead to increased operational risk and potential outages. In addition, required steps in the decommissioning process are often missed. This leads to a build-up of "technology debris," as well as costly maintenance of unneeded technology components.

SUMMARY OF THE INVENTION

Systems and methods for automated technology decommissioning are disclosed. In one embodiment, in an information processing apparatus comprising at least one computer processor, a computer application executed by the at least one computer processor, a method for automated technology resource decommissioning may include: (1) retrieving information relating to a status of a plurality of technology resources; (2) identifying one of the plurality of technology resources for decommissioning based on the information; (3) creating a decommissioning record for the identified technology resource, the decommissioning record identifying a plurality of micro services for executing a decommissioning plan; (4) executing the decommissioning plan to decommission the identified technology resource; and (5) removing or reusing the decommissioned identified technology resource.

In one embodiment, the method may further include receiving approval of the decommissioning record before executing the decommissioning plan.

In one embodiment, the method may further include quarantining the identified technology resource before executing the decommissioning plan.

In one embodiment, the decommissioning record may further identify an automated script or a program to execute the decommissioning plan.

In one embodiment, the technology resource may include a hardware resource.

In one embodiment, the technology resource may include a software resource.

In one embodiment, the technology resource may include a storage device.

In one embodiment, the technology resource may include a network resource.

In one embodiment, the information retrieved may include a shelf life for the technology resource, a make and model of the technology resource, and a cost of the technology resource.

In one embodiment, the technology resource may be identified for decommissioning based on one of an age, an application lifecycle, an investment strategy, and a required technology refresh.

According to another embodiment, a system for automated technology resource decommissioning may include a plurality of technology resources and a decommissioning computer program executed by a computer processor. The decommissioning computer program may retrieve information relating to a status of each of the plurality of technology resources; identify one of the plurality of technology resources for decommissioning based on the information; create a decommissioning record for the identified technology resource, the decommissioning record identifying a plurality of micro services for executing a decommissioning plan; execute the decommissioning plan to decommission the identified technology resource; and remove or reuse the decommissioned identified technology resource.

In one embodiment, the decommissioning computer program may receive approval of the decommissioning record before executing the decommissioning plan.

In one embodiment, the decommissioning computer program may quarantine the identified technology resource before executing the decommissioning plan.

In one embodiment, the decommissioning record may further identify an automated script or a program to execute the decommissioning plan.

In one embodiment, the technology resource may include a hardware resource.

In one embodiment, the technology resource may include a software resource.

In one embodiment, the technology resource may include a storage device.

In one embodiment, the technology resource may include a network resource.

In one embodiment, the information retrieved may include a shelf life for the technology resource, a make and model of the technology resource, and a cost of the technology resource.

In one embodiment, the technology resource may be identified for decommissioning based on one of an age, an application lifecycle, an investment strategy, and a required technology refresh.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for automated technology decommissioning. In embodiments, a centralized application and infrastructure decommission process may be defined, and some or all aspects of the workflow, from decommission selection through execution, may be automated.

Figure 1:
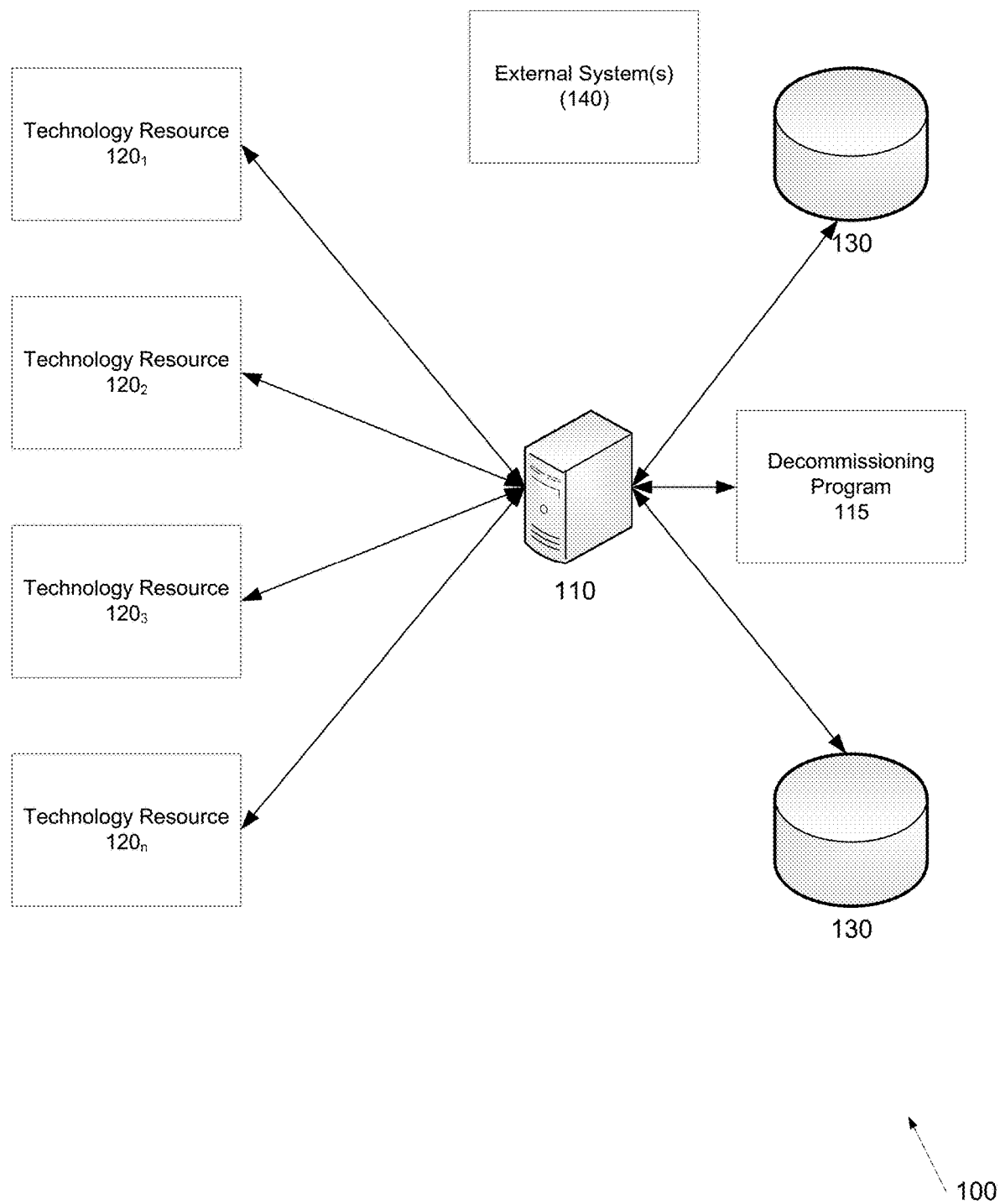
FIG. 1 depicts a system for automated technology decommissioning according to one embodiment.

Referring to FIG. 1, a system for automated technology decommissioning is disclosed according to one embodiment. System 100 may include server 110, which may execute decommissioning program or application 115, technology resources 120$_1$, 120$_2$, . . . 120$_n$, and one or more database 130 that may store data about technology resources 120, business specific data, etc. In one embodiment, technology resources 120 may be any suitable hardware and/or software resource, including, for example, storage (e.g., network attached storage (NAS), storage area networks (SAN), backup, archive, etc.), network resources (e.g., switches, routers, firewalls, IPs, name spaces, load balancers, etc.), computer programs, applications, web instances, databases, batch jobs running on the servers, message queues, backup policies, entitlements, etc.

In one embodiment, decommissioning program or application 115 may integrate with one or more external system 140 that may provide information regarding the presence of one or more technology resource 120. Examples of external systems 140 include application management systems, business solutions, etc.

In one embodiment, database 130 may store information on technology resources 120, such as each resource's infrastructure products, shelf life, make/model, cost, storage/back-up specifics, etc.

Figure 2:
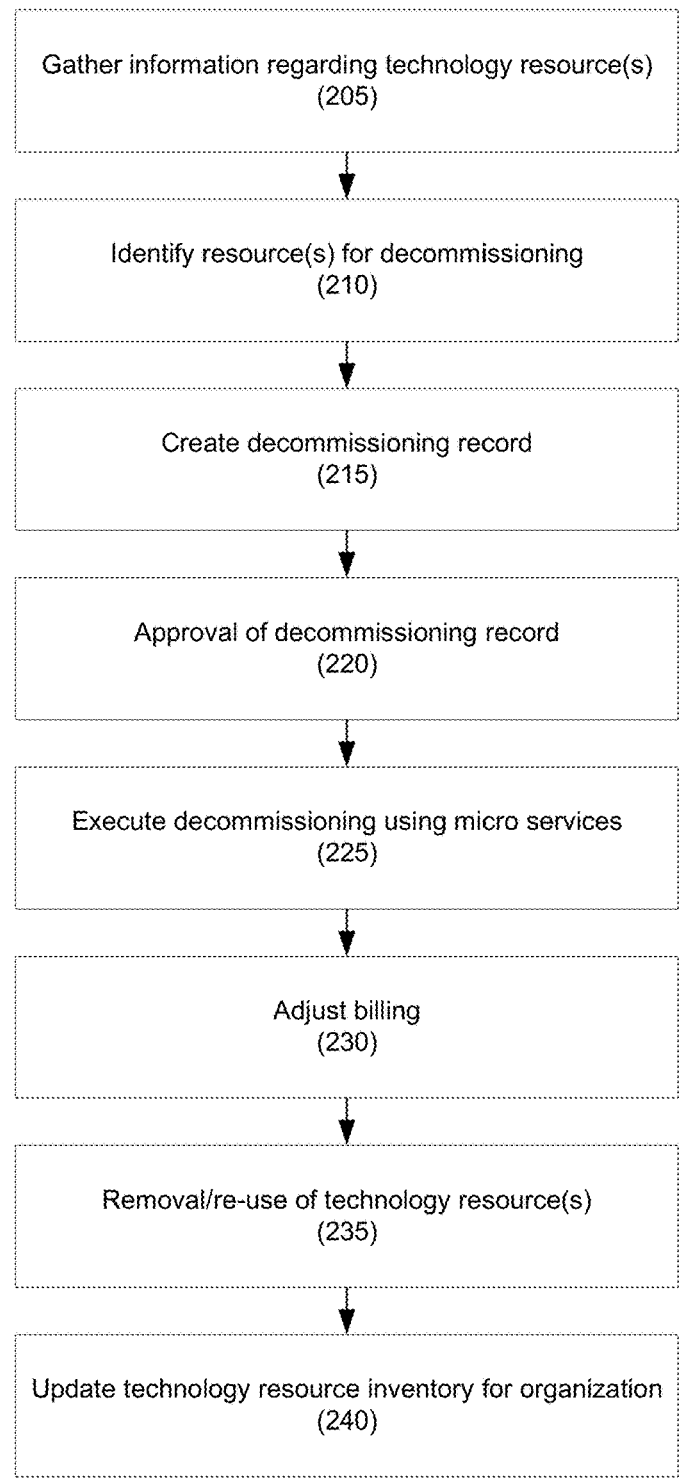
FIG. 2 depicts a method for automated technology decommissioning according to one embodiment.

Referring to FIG. 2, a method for automated technology decommissioning is disclosed according to one embodiment.

In step 205, a decommissioning computer program or application may gather information about technology resources within a network, a subnetwork, an organization, a subunit of an organization, etc. Technology resources may include any suitable hardware and/or software resource, including, for example, storage (e.g., network attached storage (NAS), storage area networks (SAN), backup, archive, etc.), network resources (e.g., switches, routers, firewalls, IPs, name spaces, load balancers, etc.), computer programs, applications, web instances, databases, batch jobs running on the servers, message queues, backup policies, entitlements, etc.

In one embodiment, the decommissioning computer program or application may query each resource for status information. For example, the computer program or application may gather information through an engine component (not shown) that may connect with the resources and other data sources to fetch data that is relevant to decommissioning. Examples of data that may be retrieved may include information pertaining to compute instances, database instances, web instances, network configurations, middleware, upstream and downstream connections, etc.

In step 210, based on the information received, the computer program or application may identify one or more technology resource for decommissioning. In one embodiment, the technology resource may be identified for decommissioning when it has not been used or accessed for a predetermined period of time, when its use is below a predetermined threshold, when it reaches a certain age, etc.

Examples of factors that may be considered in determining eligibility for decommissioning may include, as applicable, (1) age of hardware; (2) application lifecycle vis-à-vis an investment strategy; (3) required technology refreshes (e.g., old hardware needs to be replaced with new hardware); and (4) datacenter exit (i.e., when a datacenter needs to be closed down).

In step 215, the computer program or application may create a decommissioning record to decommission the identified technology resource. In one embodiment, the decommissioning record may identify a decommissioning plan, such as the steps necessary to decommission the technology resource, including any automated scripts, programs, etc. necessary to facilitate the decommissioning. For example, each decommissioning record may include a unique identifier for the technology resources identified for decommission, as well as for any technology recourses that are dependent on the identified technology resource.

In step 220, a decommissioning request may go through an approval process. In one embodiment, the request may be reviewed, and, if approved, notifications informing the status of the decommission record may be provided to all entities associated with the technology resource.

In step 225, the computer program or application may execute the decommissioning record to decommission the identified technology resource. In one embodiment, one or more micro services may execute the decommissioning record. For example, for the technology resources that are identified for decommissioning, the associated micro services responsible for handling decommissioning of the technology resource type may execute the request, which may include logical decommissioning of the servers.

In one embodiment, before the micro services execute the decommissioning record, there may be quarantine period for observing any impact that the decommissioning record may have on other systems.

In step 230, the computer program or application may adjust an billing or costs associated with the decommissioned technology resource. For example, once a technology resource is decommissioned, the responsible business unit may no longer be charged or billed for the decommissioned technology resource.

In step 235, the decommissioned technology resource may be removed from the network or organization, or may be re-used or reallocated for a different purpose.

In step 240, the technology resources inventory may be updated so that the centralized view of technology resources in an organization is current, and that any decommissioned technology resources may be reused as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include high level, assembly, object oriented languages, including Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated hardware resource decommissioning, comprising:
    in an information processing apparatus comprising at least one computer processor, a computer application executed by the at least one computer processor:
        retrieving usage information for each of a plurality of hardware resources;
        identifying one of the plurality of hardware resources for decommissioning based on the usage information;
        determining one or more additional hardware resource associated with the identified hardware resource and a unique identifier that associates the identified hardware resource with the one or more additional hardware resource;
        creating a decommissioning record for the identified hardware resource, the decommissioning record identifying a plurality of micro services for executing a decommissioning plan, wherein the decommissioning record includes the unique identifier for the identified hardware resource;
        executing the decommissioning plan to decommission the identified hardware resource, wherein the decommissioning plan is associated with the unique identifier, the identified hardware resource, and the one or more additional hardware resource; and
        removing or reusing the decommissioned identified hardware resource.

2. The method of claim 1, further comprising:
    receiving approval of the decommissioning record before executing the decommissioning plan.

3. The method of claim 1, further comprising:
    quarantining the identified hardware resource before executing the decommissioning plan.

4. The method of claim 1, wherein the decommissioning record further identifies an automated script or a program to execute the decommissioning plan.

5. The method of claim 1, wherein the hardware resource comprises a storage device.

6. The method of claim 1, wherein the hardware resource comprises a network resource.

7. The method of claim 1, further comprising retrieving a shelf life for the hardware resource, a make and model of the hardware resource, and operating cost of the hardware resource, and wherein the hardware resource is further identified for decommissioning based on at least one of the shelf life for the hardware resource, the make and model of the hardware resource, and the cost of the hardware resource.

8. The method of claim 1, wherein the hardware resource is further identified for decommissioning based on at least one of an age, a hardware lifecycle, an investment strategy, and a required hardware refresh.

9. The method of claim 1, wherein the usage information comprises at least one of compute instances, database instances, web instances, network configurations, middleware, and upstream/downstream connections executed by each hardware resource.

10. A system for automated hardware resource decommissioning, comprising:
    a plurality of hardware resources; and
    a decommissioning computer program executed by a computer processor;
    wherein the decommissioning computer program:
        retrieves usage information for each of the plurality of hardware;

identifies one of the plurality of hardware resources for decommissioning based on the usage information;

determines one or more additional hardware resource associated with the identified hardware resource and a unique identifier that associates the identified hardware resource with the one or more additional hardware resource;

creates a decommissioning record for the identified hardware resource, the decommissioning record identifying a plurality of micro services for executing a decommissioning plan, wherein the decommissioning record includes the unique identifier for the identified hardware resource;

executes the decommissioning plan to decommission the identified hardware resource, wherein the decommissioning plan is associated with the unique identifier, the identified hardware resource, and the one or more additional hardware resource; and removes or reuses the decommissioned identified hardware resource.

11. The system of claim 10, wherein the decommissioning computer program receives approval of the decommissioning record before executing the decommissioning plan.

12. The system of claim 10, wherein the decommissioning computer program quarantines the identified hardware resource before executing the decommissioning plan.

13. The system of claim 10, wherein the decommissioning record further identifies an automated script or a program to execute the decommissioning plan.

14. The system of claim 10, wherein the hardware resource comprises a storage device.

15. The system of claim 10, wherein the hardware resource comprises a network resource.

16. The system of claim 10, wherein the decommissioning computer program further retrieves a shelf life for the hardware resource, a make and model of the hardware resource, and a cost of the hardware resource, and identifies the hardware resource for decommissioning based on at least one of the shelf life for the hardware resource, the make and model of the hardware resource, and the cost of the hardware resource.

17. The system of claim 10, wherein the decommissioning computer program further identifies the hardware resource for decommissioning based on at least one of an age, a hardware lifecycle, an investment strategy, and a required hardware refresh.

18. The system of claim 10, wherein the usage information comprises at least one of compute instances, database instances, web instances, network configurations, middleware, and upstream/downstream connections executed by each hardware resource.

* * * * *